United States Patent [19]

Forrest, Jr.

[11] Patent Number: 5,327,819

[45] Date of Patent: Jul. 12, 1994

[54] PEANUT BLANCHING PROCESS

[75] Inventor: James T. Forrest, Jr., Smyrna, Ga.

[73] Assignee: Seabrook Enterprises, Inc., Atlanta, Ga.

[21] Appl. No.: 28,382

[22] Filed: Mar. 9, 1993

[51] Int. Cl.⁵ .............................................. A23N 5/01
[52] U.S. Cl. ........................................ 99/629; 99/623; 99/628
[58] Field of Search ................. 99/623, 628, 629, 630; 141/231, 232; 74/104; 198/637; 51/135 R

[56] References Cited

U.S. PATENT DOCUMENTS

| | | | |
|---|---|---|---|
| 1,388,394 | 8/1921 | Witt | 99/628 |
| 1,545,826 | 7/1925 | Galli | 99/629 |
| 3,196,914 | 7/1965 | Gardner | 99/629 |
| 3,951,057 | 4/1976 | Gardner | 99/629 |
| 4,108,301 | 8/1978 | Trozzi | 198/637 |
| 4,317,411 | 3/1982 | Forrest et al. | 99/623 |
| 4,325,297 | 4/1982 | Weyant | 99/629 |
| 4,441,409 | 4/1984 | Weyant | 99/623 |

Primary Examiner—Timothy F. Simone
Assistant Examiner—Reginald L. Alexander
Attorney, Agent, or Firm—Needle & Rosenberg

[57] ABSTRACT

An improved apparatus for blanching nuts, particularly peanuts, is provided wherein nuts are fed onto a conveyor belt by a single feeder means which carries them against a diagonally positioned nut engaging means that has a nut discharge end which extends beyond the edge of the conveyor belt. The nuts are rotated by the simultaneous forces of the conveyor belt and the nut engaging means, during which their skins are removed. After the nuts traverse the width of the conveyor belt against the nut engaging means, they are deposited into a collecting hopper at the side of the conveyor belt, where they await the next stage of preparation.

9 Claims, 3 Drawing Sheets

PEANUT BLANCHING PROCESS

BACKGROUND OF THE INVENTION

1. Field of the Invention

The present invention relates generally to a device for processing nuts, and more particularly, is directed towards an improved device which spin blanches peanuts to yield a greater percentage of non-split, blanched nuts.

2. The Prior Art

The preparation of edible nuts often involves a blanching stage, in which the thin dark skin of the shelled nuts is removed. Blanching may be achieved by a variety of procedures and equipment. For example, water blanching is an early process in which the nuts are soaked in water to loosen the skins and then passed along a horizontal belt beneath oscillating pads which rub the skins from the nuts.

More recently, dry blanching techniques have been employed. In this process, the nut skins are commonly first sliced by passing them through a pair of mounted blades. This stage is often followed by a thermoregulation cycle, where the nuts are heated and cooled to promote skin peeling at the sliced edges. The nuts are then dry blanched by depositing them on a moving conveyor belt by multiple vibrating nut feeders. The belt conveys the nuts against fixed abrasive nut engaging means, or baffles, positioned diagonally across and just above the surface of the conveyor belt. The combined action of the moving conveyor belt and the abrasive engaging means causes the nuts to spin and lose their skins as they pass across the conveyor belt. The amount of blanching action required is determined by the ripeness, size and water content of the particular batch of nuts being processed. To accommodate such variations, dry blanching devices are adjustable to alter the speed and distances traveled along the conveyor belt against the nut engaging means appropriate to effect skin removal.

Also, the collection means for blanched nuts in the prior art frequently results in subsequent nut splitting as the blanched nuts are roughly passed from the end portion of the nut engaging means to the fast moving conveyor belt for collection at the end of the belt. Furthermore, the volume of nuts passing through the dry blanching device after prolonged use causes substantial deterioration and wear to the baffles, which are not economically replaceable.

SUMMARY OF THE INVENTION

This invention features an improved device for blanching shelled nuts wherein nuts are deposited onto a rapidly moving conveyor belt by a single unit vibratory feeder. The conveyor belt carries the nuts against a nut engaging means which extends closely above and diagonally across the conveyor belt. The nut engaging means includes a plurality of spaced-apart, rectangular-shaped members which have a nut engaging face that comprises a detachable strip with an abrasive outer surface. The strip has two opposed abrasive surfaces so that the strip can be reversed when one of the surfaces wears out. The nut engaging means projects past the discharge side of the conveyor belt which greatly shortens the distance the nuts have to travel along the belt and be subjected to the abrasive forces of the nut engaging means and the conveyor belt surface. As a result, the quality of the blanched peanuts is improved. This is in the form of a lower percentage of splits and unblanched kernels.

DETAILED DESCRIPTION OF THE PREFERRED EMBODIMENT

Figure 1:
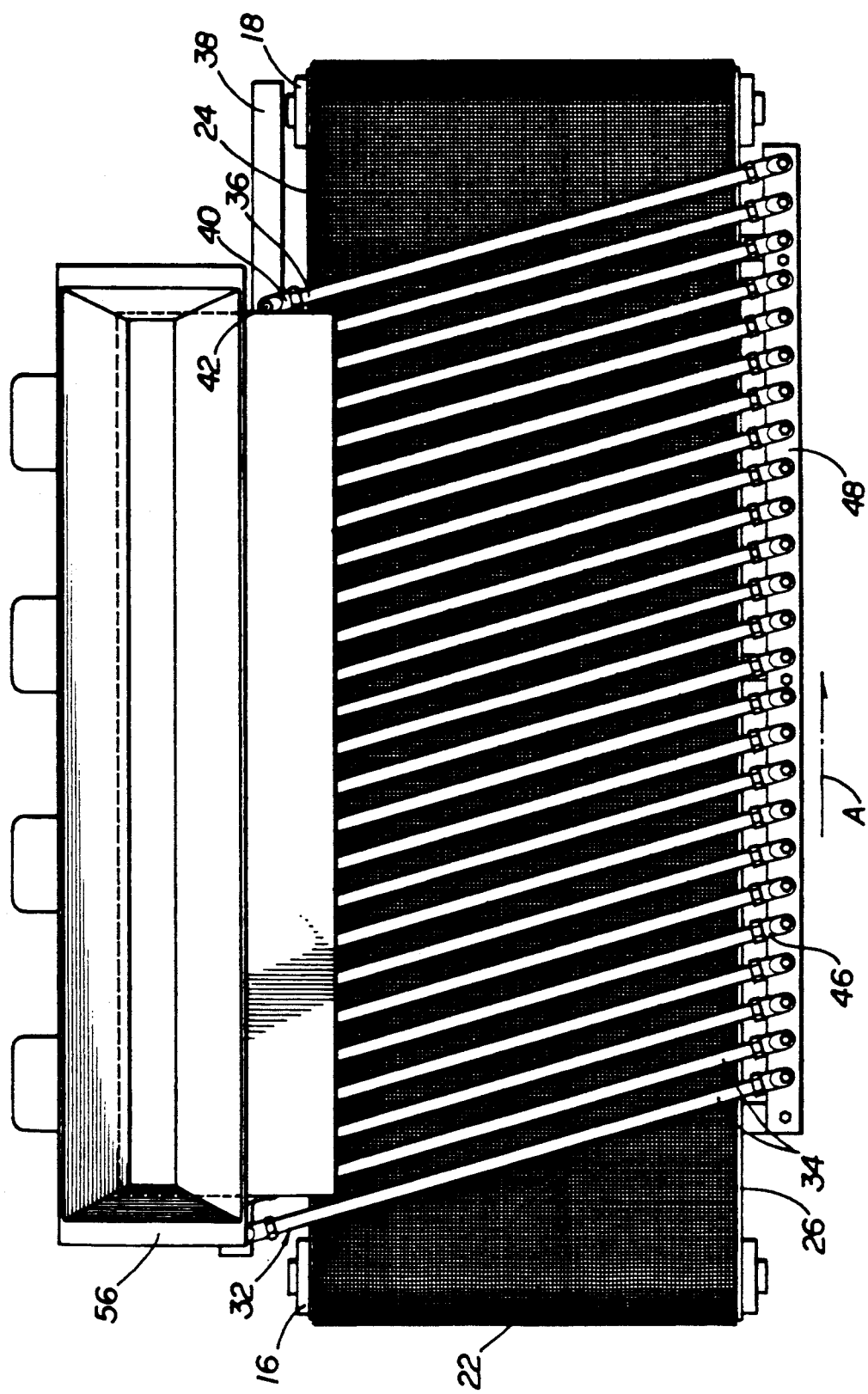
FIG. 1 is a top plan view of the present invention.
Figure 2:
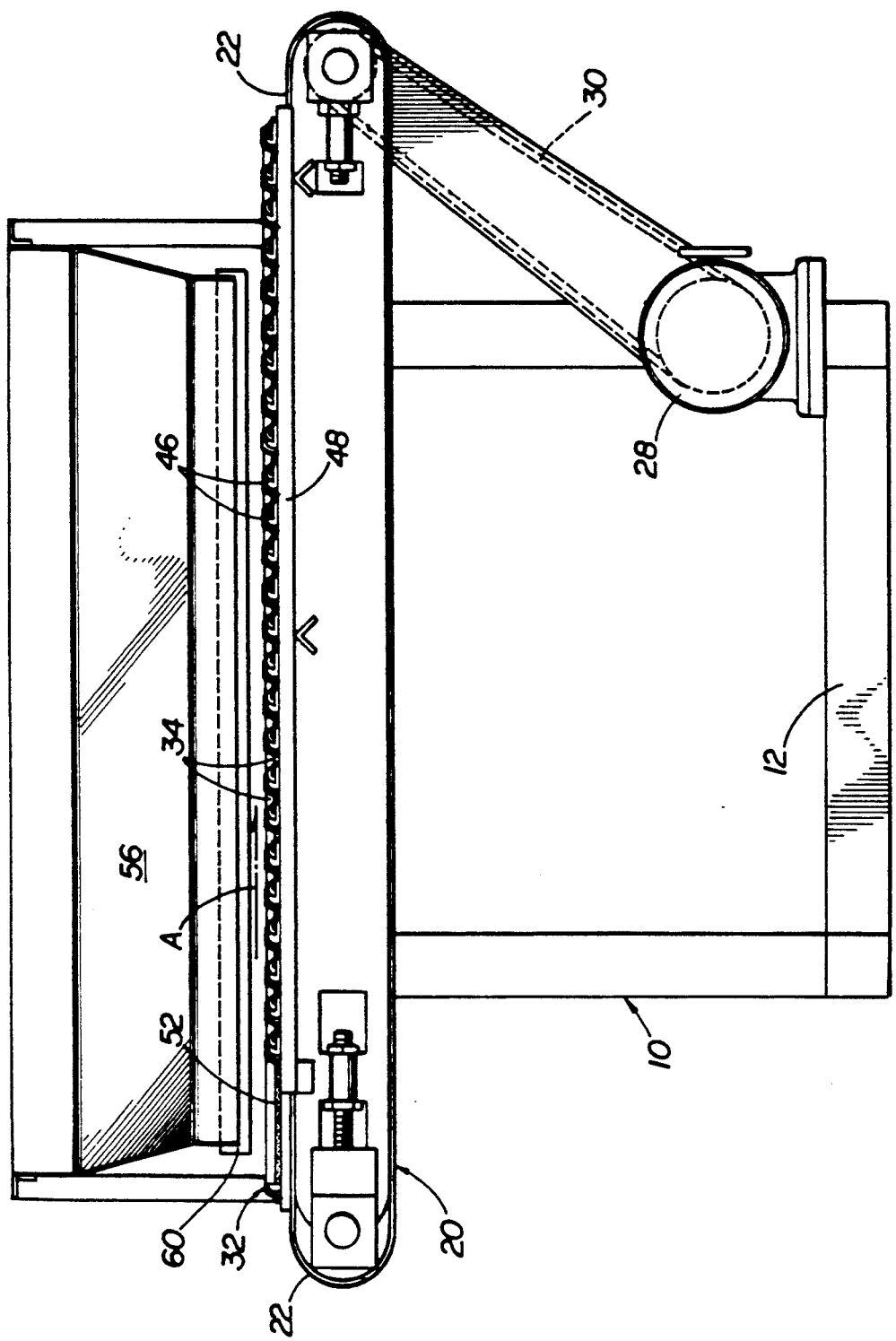
FIG. 2 is a side elevational view thereof.
Figure 3:
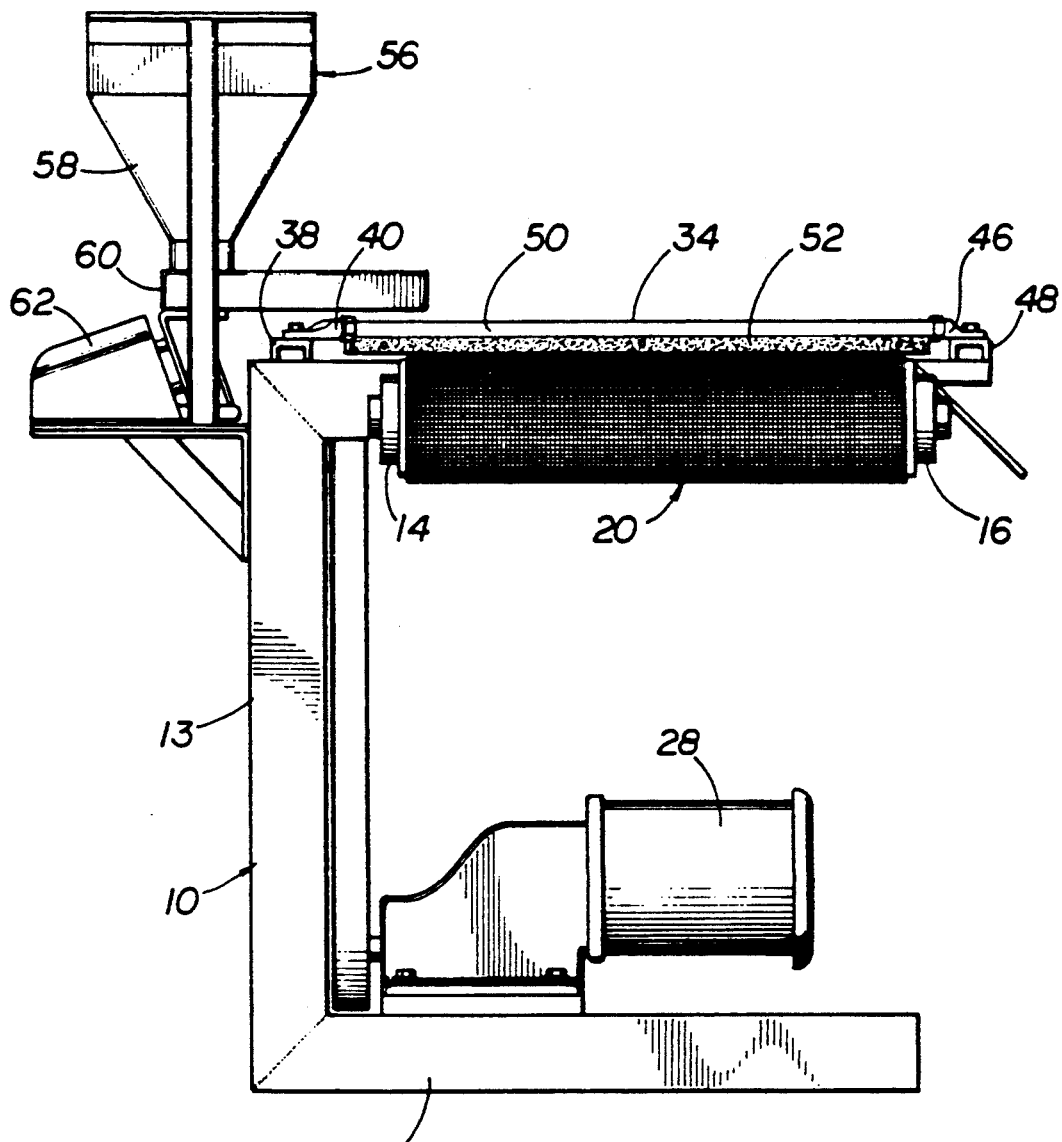
FIG. 3 is an end elevational view of the present invention.

Referring now to the drawings, FIG. 3 shows that the nut blanching device 8 of the present invention is generally of a frame 10 which has a base portion 12, an upstanding section 13 and an upper portion 14 that extends from the top of the upstanding section 13. Two parallel rollers 16 and 18 are mounted on the upper portion 14. An endless loop conveyor belt 20 having a substantially horizontal upper reach encompasses the rollers 16 and 18. The preferred conveyor belt 20 is about 36 inches wide and has an upper surface length of about six feet. The belt's outer surface 22 is ideally constructed from a durable material, such as reinforced rubber, and expresses a tightly repeating pattern of very small, cone-shaped protrusions which provide a frictional surface for moving the nuts forward with the belt 20. A suitable belt 20 having a ⅛ inch dome pebble top surface can be obtained from Champrene Division, Witco Corporation, 570 Fishkill Avenue, Beacon, N.Y. 12508. As seen in FIG. 1, the upper reach of the conveyor belt 20 includes a nut receiving side 24 that is disposed beneath the hopper—of the nut feeding means—described below and an opposite nut discharge side 26.

The conveyor belt 20 is driven in direction A (FIG. 1) about the rollers 16 and 18 by means of a variable speed motor 28 mounted on the base portion 12 and connected to the roller 18 by a drive belt 30. The preferred embodiment utilizes a 1.5 electric horsepower three-phase motor. The drive belt 30 may be comprised of re-enforced vulcanized rubber or other similar materials. Also, the drive means for the belt could comprise a conventional gear with sprockets mounted on a shaft of the motor in mesh with a chain about a gear mounted on the roller 18 (not shown).

Figure 4:
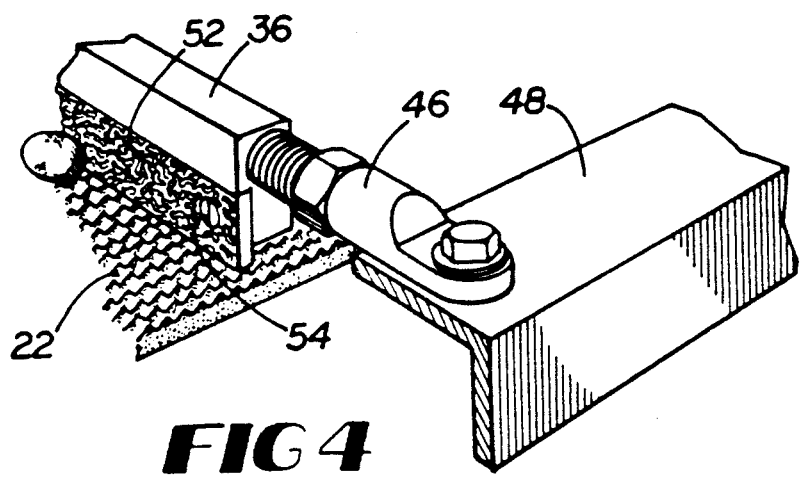
FIG. 4 is a detailed perspective view of one of the rods of the nut engaging means.

As seen in FIG. 1, a nut engaging means 32 is mounted on the frame above the upper reach of the conveyor and comprises a plurality of spaced-apart rectangular-shaped members 34 which are positioned at an angle to the upper reach of the conveyor belt 20. The threaded first ends 36 of the members 34 adjacent the nut receiving side 24 of the conveyor 20 are individually secured to longitudinally extending channel member 38 by means of threaded connectors 40 and bolts 42. The member 38 extends along the nut receiving side 24 of the conveyor 20. As seen in FIG. 4, the threaded second ends 44 of the members 34 are received in threaded connectors 46 which are bolted to channel member 48 which longitudinally extends adjacent the nut discharge side 26 of the conveyor 20. The second ends 44 extending over the nut discharge side 26, are the nut-discharge ends of the members 34.

The nut engaging face 50 of the member 34 includes a strip 52 which longitudinally extends along face 50 adjacent its bottom. The strip 52 has an abrasive front side formed of tungsten grit which, in combination with the surface 22 of the belt 20, causes the peanuts that are disposed between the members 34 to be rolled diagonally across the belt 20 and along the strip 52, thereby removing the skin from the nut. The rear face of the strip 52, opposite the front face, also has an abrasive surface. Each strip 52 is removably secured to the face 50 by means of screw 54 so that when the abrasive surface on one face is worn down, the strip 52 may be flipped to present its opposite abrasive surface.

The members 34 of the nut engaging means 32 form an off-angle of approximately 16 degrees relative to the conveyor belt 20 and extend beyond the width of the conveyor belt 20, over the discharge side 26. As the nuts travel between the members 34 directed by the moving conveyor belt 20, they are directed off the discharge side 26 into a collecting means 70 instead of traveling the length of the belt 20.

Each member 34 is mounted to allow pivoting about a vertical axis so that the angle of the members 34 relative to the upper reach of the conveyor 20 can be adjusted. The optimum attack-angle is about 23 degrees relative to the upper surface 22 of the conveyor belt 20.

The nuts are deposited onto the belt 20 by a nut feeding means 56 positioned on the frame 10 above the belt 20 and includes a hopper 58 which empties into a vibratory feeder 60 that is connected to vibrator motor 62. The invention specifically utilizes a single unit vibrating SYNTRON feeder made by FMC Corporation, Homer City, Pa. 15748-9234. Also contemplated, however, are other, conventional V-shaped hopper means that have a vibratory feature to prevent nut jamming. The feeding means 56 disposes a steady stream of nuts across the receiving side 24 of the conveyor belt 20, such that a single line of nuts is passed down each member 34.

What I claim is:

1. An improved nut blanching device of the type having a frame, an endless belt on the frame, the belt having a nut receiving side and an opposite, parallel nut discharge side along its upper reach, means positioned above the upper reach of the belt for delivering nuts to the nut receiving side of the belt, a drive means connected to the belt and a nut engaging means mounted on the frames above and disposed across the belt, wherein the improvement comprises the nut engaging means having a nut discharge end which is adjacent to and extends beyond the nut discharge side of the belt.

2. A nut blanching device comprising:
   a. a support frame;
   b. an endless conveyor belt mounted on the frame and having a substantially horizontal upper reach with a peanut receiving side and a parallel peanut discharge side;
   c. drive means on the frame connected to the conveyor belt;
   d. a nut engaging means disposed at an angle across and slightly above the upper reach of the conveyor belt with a discharge end which is adjacent to and extends beyond the discharge side of the conveyor belt; and,
   e. nut collecting means disposed below the discharge side of the belt for receiving blanched nuts.

3. A nut blanching device as in claim 2 wherein the nut engaging means comprises a plurality of spaced-apart, parallel, rectangular-shaped members, each having an abrasive nut engaging strip detachably secured thereon.

4. A nut blanching device as in claim 3 wherein the strip has longitudinally extending, opposed faces, each face having an abrasive surface thereon.

5. A nut blanching device as in claim 1, wherein the nut engaging means comprises a plurality of parallel members extending uniformly beyond the nut discharge side of the belt.

6. A nut blanching device as in claim 5, wherein the plurality of parallel members are spaced-apart and are each rectangular-shaped and have an abrasive nut engaging strip detachably secured thereon.

7. A nut blanching device as in claim 2, wherein the nut engaging means comprises a plurality of parallel members extending uniformly beyond the nut discharge side of the belt.

8. A nut blanching device as in claim 3, wherein the nut engaging means further comprises a plurality of members extending uniformly beyond the nut discharge side of the belt.

9. A nut blanching device as in claim 4, wherein the nut engaging means further comprises a plurality of members extending uniformly beyond the nut discharge side of the belt.

* * * * *